US012811664B2

(12) United States Patent
Shalmashi et al.

(10) Patent No.: US 12,811,664 B2
(45) Date of Patent: Nov. 24, 2026

(54) KPI-DRIVEN HARDWARE AND ANTENNA CALIBRATION ALARM THRESHOLD OPTIMIZATION USING MACHINE LEARNING

(71) Applicant: Telefonaktiebolaget LM Ericsson (publ), Stockholm (SE)

(72) Inventors: Serveh Shalmashi, Enebyberg (SE); Sepideh Afsar Doost, Ottawa (CA); Frida Svensson, Stockholm (SE); Georgy Levin, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

(21) Appl. No.: 19/110,084

(22) PCT Filed: Oct. 13, 2022

(86) PCT No.: PCT/IB2022/059832
§ 371 (c)(1),
(2) Date: Mar. 9, 2025

(87) PCT Pub. No.: WO2024/079509
PCT Pub. Date: Apr. 18, 2024

(65) Prior Publication Data

US 2026/0088888 A1 Mar. 26, 2026

(51) Int. Cl.

| | |
|---|---|
| ***H04B 7/08*** | (2006.01) |
| ***H04B 17/391*** | (2015.01) |
| ***H04L 41/16*** | (2022.01) |
| ***H04W 28/02*** | (2009.01) |

(52) U.S. Cl.
CPC ......... *H04B 7/086* (2013.01); *H04B 17/3913* (2015.01); *H04L 41/16* (2013.01); *H04W 28/0268* (2013.01)

(58) Field of Classification Search
CPC ..... H04B 7/086; H04B 17/3913; H04L 41/16; H04W 28/0268; H04W 24/04; G06N 3/08; G06N 20/00; G06N 3/044
(Continued)

(56) References Cited

U.S. PATENT DOCUMENTS

2015/0288465 A1* 10/2015 Ouyang ................. H04B 17/18
455/67.11
2020/0382361 A1 12/2020 Chandrasekhar et al.
(Continued)

FOREIGN PATENT DOCUMENTS

EP 3916505 A2 12/2021
WO 2022208133 A1 10/2022

OTHER PUBLICATIONS

Chen, Meng, et al., "Root Cause Analysis for Self-organizing Cellular Network: an Active Learning Approach," Mobile Networks and Applications, vol. 25, Issue 6, Jun. 20, 2020, Springer Nature, pp. 2506-2516.
(Continued)

*Primary Examiner* — Emmanuel Bayard
(74) *Attorney, Agent, or Firm* — Withrow & Terranova, PLLC

(57) ABSTRACT

Systems and methods are disclosed that relate to Key Performance Indicator (KPI)-driven alarm threshold optimization using machine learning. In one embodiment, a computer-implemented method comprises obtaining network-level KPI data for a network and radio log data for one or more radio systems in the network. The KPI data comprises KPI values for one or more network-level KPIs, and the radio log data comprises a number of faulty or uncalibrated antenna branches in the radio system and cell or user beamforming weights. The method further comprises pre-processing the KPI data and the radio log data, labeling the pre-processed KPI data as degraded or non-degraded, and
(Continued)

training, with the labeled KPI data and the pre-processed radio log data, a fault classifier Machine Learning (ML) model to output a value(s) that represent a probability that the KPI(s) will be degraded for a given input feature set.

20 Claims, 12 Drawing Sheets

(58) Field of Classification Search
USPC .......................................................... 375/262
See application file for complete search history.

(56) References Cited

U.S. PATENT DOCUMENTS

| | | | | |
|---|---|---|---|---|
| 2022/0373612 | A1* | 11/2022 | Tharmakulasingam | G01R 31/085 |
| 2023/0316045 | A1* | 10/2023 | Rama | G06N 3/0455<br>706/25 |
| 2023/0376372 | A1* | 11/2023 | Chen | G06F 11/0709 |
| 2024/0121636 | A1* | 4/2024 | Wang | H04W 24/08 |

OTHER PUBLICATIONS

Wang, Yilin et al., "Intelligent Fault Diagnosis Method for Mobile Cellular Networks," IEEE Globecom Workshops, Dec. 7, 2021, IEEE, 6 pages.

International Search Report and Written Opinion for International Patent Application No. PCT/IB2022/059832, mailed Jun. 6, 2023, 14 pages.

* cited by examiner

KPI-DRIVEN HARDWARE AND ANTENNA CALIBRATION ALARM THRESHOLD OPTIMIZATION USING MACHINE LEARNING

This application is a 35 U.S.C. § 371 national phase filing of International Application No. PCT/IB2022/059832, filed Oct. 13, 2022, the disclosure of which is incorporated herein by reference in its entirety.

TECHNICAL FIELD

The present disclosure is directed to systems and methods for Key Performance Indicator (KPI)-driven Hardware (HW) and/or Antenna Calibration (AC) ("HW/AC") alarm threshold optimization using machine learning (ML).

BACKGROUND

Massive Multiple Input Multiple Output (MIMO) has been proven to increase the capacity and performance of Fourth Generation (4G) and Fifth Generation (5G) cellular networks. One of the pillars of Massive MIMO radios is beamforming, which requires amplitude and phase calibration of the antenna branches. When several antenna branches are not calibrated or not functional due to hardware or software faults, the resulting beam pattern may become distorted, which, in turn, may impact network Key Performance Indicators (KPIs), such as cell throughput, signal-to-interference-and-noise ratio (SINR), packet loss etc.

Time Division Duplex (TDD) and Frequency Division Duplex (FDD) Massive MIMO radios are equipped with supervision features that allow detecting faulty and uncalibrated downlink (DL) and uplink (UL) branches. Considering a 5G New Radio (NR) base station (i.e., a next generation Node B (gNB)) or a Long Term Evolution (LTE) base station (i.e., an evolved Node B (eNB)), a radio unit reports faulty and uncalibrated branches to the Digital Unit (DU) of the base station. When the number of faulty branches exceeds a predefined threshold (e.g., 12.5%) of the total number of antenna branches, the DU generates a Hardware (HW) and/or Antenna Calibration (AC) ("HW/AC") alarm. The DU takes actions to recover and cease the alarm. If after several recovery attempts, the HW/AC alarm persists, the radio unit is often decommissioned. The predefined threshold (e.g., 12.5%) is a fixed threshold that is set such that, when this threshold is met, it can be assumed that the radio unit is unable to meet Third Generation Partnership Project (3GPP) output power requirements as well as a Mean Time Between Failures (MTBF) target of commercial radios.

SUMMARY

Systems and methods are disclosed that relate to Key Performance Indicator (KPI)-driven Hardware (HW) and/or Antenna Calibration (AC) ("HW/AC") alarm threshold optimization using machine learning. In one embodiment, a computer-implemented method comprises obtaining network-level KPI data for a network and radio log data for one or more radio systems in the network. The network-level KPI data comprises KPI values for one or more network-level KPIs, and the radio log data comprises (a) a number of faulty or uncalibrated antenna branches in the radio system and (b) cell or user beamforming weights. The method further comprises pre-processing the network-level KPI data and the radio log data to provide pre-processed network-level KPI data and pre-processed radio log data, labeling the pre-processed network-level KPI data as degraded or non-degraded, and training, with the labeled network-level KPI data and the pre-processed radio log data, a fault classifier Machine Learning (ML) model to output one or more values that represent a probability that the one or more network-level KPIs will be degraded for a given input feature set comprising input features representative of a number of faulty or uncalibrated antenna branches and cell or user beamforming weights. By using the trained fault classifier ML model, the number of alarms raised due to the HW/AC faults that do not negatively impact KPI(s) is reduced.

In one embodiment, the one or more values that represent the probability comprise a probability that the one or more network-level KPIs will be degraded for the given input feature set.

In one embodiment, the one or more values that represent the probability comprise a bit that indicates that the one or more network-level KPIS will be degraded when the bit is set to a first binary value and indicates that the one or more network-level KPIs will not be degraded when the bit is set to a second binary value.

In one embodiment, the one or more values comprise a probability that the one or more network-level KPIs will be degraded for the given input feature set, and the method further comprises generating, using the trained fault classifier ML model, one or more values that represent a probability the one or more network-level KPIS will be degraded for a given input feature set comprising a given number of faulty or uncalibrated antenna branches in the radio system and given cell or user beamforming weights. The method further comprises comparing the probability that the one or more network-level KPIs will be degraded for the given input feature set with a probability threshold and raising an alarm or refraining from raising an alarm, based on a result of comparing the probability that the one or more network-level KPIS will be degraded for the given input feature set with the probability threshold. In one embodiment, the probability threshold is static, semi-static, or dynamic.

In one embodiment, the method further comprises comparing a given number of faulty or uncalibrated antenna branches with a threshold, wherein the threshold is a threshold number of faulty or uncalibrated antenna branches determined using the trained fault classifier ML model to result in a desired threshold probability that the one or more network-level KPIs will be degraded. The method further comprises raising an alarm or refraining from raising an alarm, based on a result of the comparing. In one embodiment, the threshold is statically, semi-statically, or dynamically selected based on the trained fault classifier ML model.

In one embodiment, the threshold is determined to minimize a probability of a false negative alarm given a probability of a false positive alarm, the false negative alarm being a missed detection of faulty or uncalibrated antenna branches and the false positive alarm being a raised false alarm.

In one embodiment, pre-processing the network-level KPI data and the radio log data to provide the pre-processed network-level KPI data and the pre-processed radio log data comprises time-aligning the network-level KPI data with the radio log data, transforming the network-level KPI data into a first set of features that is usable by the fault classifier ML model, and transforming the radio log data into a second set of features that is usable by the fault classifier ML model, wherein the first set of features corresponds to the pre-processed network-level KPI data, and the second set of features corresponds to the pre-processed radio log data.

Corresponding embodiments of a node are also disclosed. In one embodiment, a node is adapted to obtain network-level KPI data for a network and radio log data for one or more radio systems in the network, wherein the network-level KPI data comprising KPI values for one or more network-level KPIs and the radio log data comprising (a) a number of faulty or uncalibrated antenna branches in the radio system and (b) cell or user beamforming weights. The node is further adapted to pre-process the network-level KPI data and the radio log data to provide pre-processed network-level KPI data and pre-processed radio log data, label the pre-processed network-level KPI data as degraded or non-degraded, and train, with the labeled network-level KPI data and the pre-processed radio log data, a fault classifier Machine Learning, ML, model to output one or more values that represent a probability that the one or more network-level KPIs will be degraded for a given input feature set comprising input features representative of a number of faulty or uncalibrated antenna branches and cell or user beamforming weights.

In another embodiment, a node comprises processing circuitry configured to cause the node to obtain network-level KPI data for a network and radio log data for one or more radio systems in the network, wherein the network-level KPI data comprising KPI values for one or more network-level KPIs and the radio log data comprising (a) a number of faulty or uncalibrated antenna branches in the radio system and (b) cell or user beamforming weights. The processing circuitry is further configured to cause the node to pre-process the network-level KPI data and the radio log data to provide pre-processed network-level KPI data and pre-processed radio log data, label the pre-processed network-level KPI data as degraded or non-degraded, and train, with the labeled network-level KPI data and the pre-processed radio log data, a fault classifier Machine Learning, ML, model to output one or more values that represent a probability that the one or more network-level KPIs will be degraded for a given input feature set comprising input features representative of a number of faulty or uncalibrated antenna branches and cell or user beamforming weights.

In another embodiment, a computer-implemented method comprises generating, using a trained fault classifier ML model, one or more values that represent a probability that one or more network-level KPIs will be degraded for a given input feature set comprising a number of faulty or uncalibrated antenna branches of an associated radio unit and cell or user beamforming weights. In one embodiment, the method further comprises comparing the probability that the one or more network-level KPIs will be degraded for the given input feature set with a probability threshold and raising an alarm or refraining from raising an alarm, based on a result of comparing the probability that the one or more network-level KPIs will be degraded for the given input feature set with the probability threshold.

Corresponding embodiments of a radio access node are also disclosed. In one embodiment, a radio access node is adapted to generate, using a trained fault classifier ML model, one or more values indicative of a probability that one or more network-level KPIs will be degraded for a given input feature set comprising a number of uncalibrated or faulty antenna branches of a radio unit of the radio access node and cell or user beamforming weights.

In one embodiment, the radio access node is further adapted to compare the probability that the one or more network-level KPIs will be degraded for the given input feature set with a probability threshold and raise an alarm or refrain from raising an alarm, based on a result of comparing the probability that the one or more network-level KPIS will be degraded for the given input feature set with the probability threshold.

In another embodiment, a radio access node comprises processing circuitry configured to cause the radio access node to generate, using a trained fault classifier ML model, one or more values indicative of a probability that one or more network-level KPIs will be degraded for a given input feature set comprising a number of uncalibrated or faulty antenna branches of a radio unit of the radio access node and cell or user beamforming weights.

In one embodiment, the processing circuitry is further configured to cause the radio access node to compare the probability that the one or more network-level KPIs will be degraded for the given input feature set with a probability threshold and raise an alarm or refrain from raising an alarm, based on a result of comparing the probability that the one or more network-level KPIS will be degraded for the given input feature set with the probability threshold.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
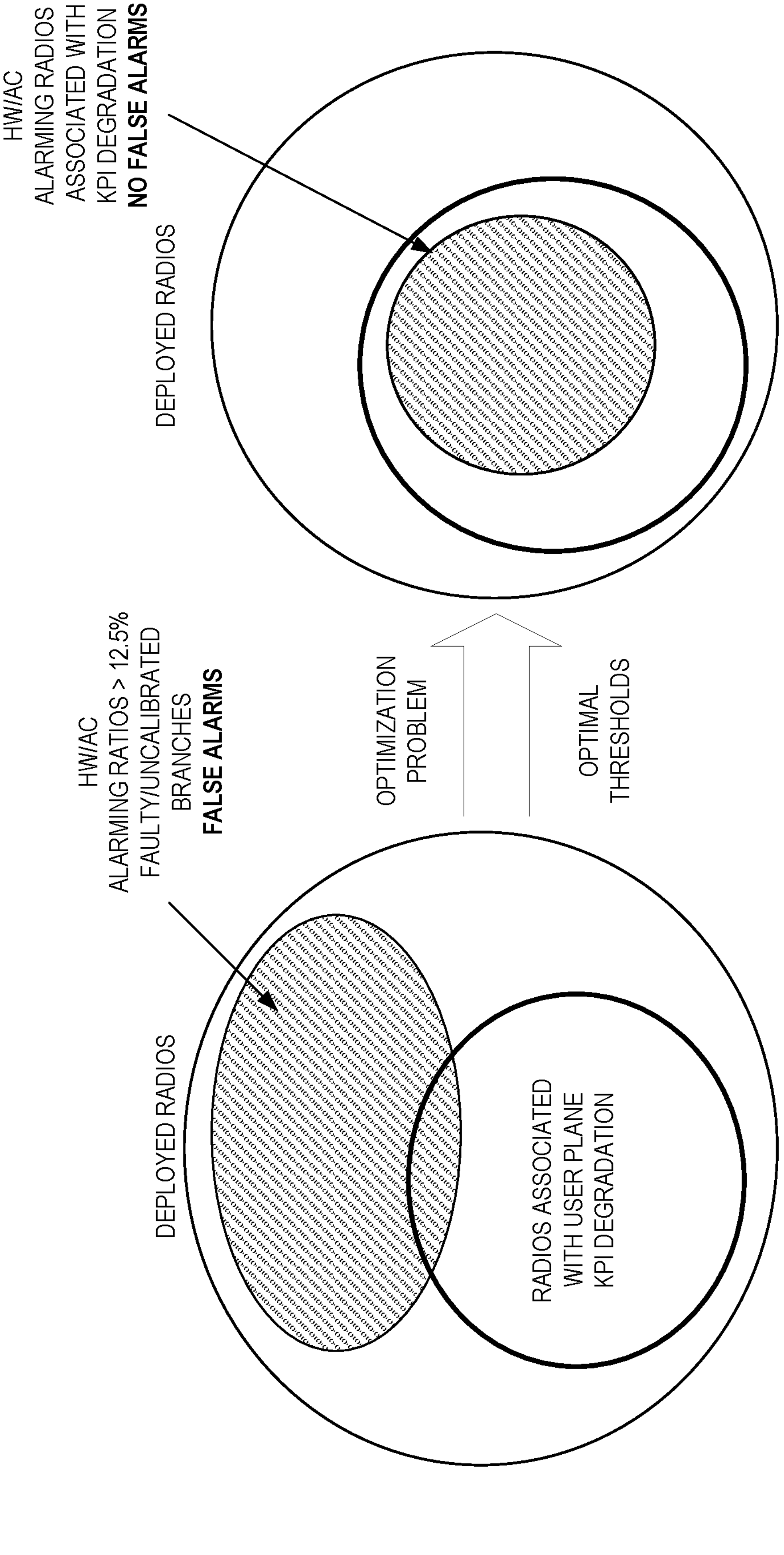
FIG. 1 illustrates Venn diagrams for a deployed radio with and without implementation of an embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As Used Herein, a "radio Node" Is Either a Radio Access Node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

While fixed alarm thresholds are used today in radio products, radio beamforming capability does not only depend on the number of faulty or uncalibrated antenna branches, but also on beamforming weights, cell environment, or fault locations within the antenna array. Sometimes Hardware (HW) and/or Antenna Calibration (AC) ("HW/AC") faults do not impact network Key Performance Indicator(s) (KPI(s)). Such faults are considered non-critical and do not require radio decommissioning. The probability of non-critical faults increases with the number of antenna branches and unnecessarily increases the Return Rate (RR) and No Fault Found (NFF) of radio products.

Systems and methods are disclosed herein that address the aforementioned problems associated with existing solutions and/or additional problems. In some embodiments, the systems and methods disclosed herein aim to: (1) associate radio log data such as sector shape, tilt, and fault rate with degraded and non-degraded labels obtained from KPI data; (2) replace the fixed alarm threshold of the existing solution with data driven static, semi-static, or dynamic thresholds that maximize the likelihood of network KPI degradation (i.e., the static, semi-static, or dynamic thresholds result in raising an alarm only when KPI degradation occurs); and (3) modify HW and AC fault management to utilize KPI-driven alarm thresholds.

In some embodiments, systems and methods are disclosed for triggering HW and AC alarms in a radio system (e.g., a base station). The systems and methods are based on a trained Machine Learning (ML) model used to distinguish between critical and non-critical faults based on the number of faulty or uncalibrated antenna branches. The ML model is trained on radio level features (e.g., number of faulty or uncalibrated antenna branches and optionally other radio level features such as, e.g., beamforming weights, etc.) by using network level KPI data as labels. Thus, the fault classification is based on the impact on network performance.

Embodiments of the systems and methods disclosed herein are directed to one or more of the following aspects:

- Using unsupervised ML methods (e.g., anomaly detection and clustering) or active learning methods to label network KPIs as degraded and non-degraded.
- Relating the labels obtained from network KPIs to associated radio log data, which includes the number of faulty or uncalibrated branches in the radio unit.
- Using a supervised ML method to train a model that outputs one or more values that represent a probability of network KPI degradation given a set of inputs including the number of faulty or uncalibrated branches and, in some embodiments, one or more additional parameters (e.g., cell or user beamforming weights, sector shape, or the like).
  - In one embodiment, the trained model is then used, during an inference phase, to provide one or more values that represent a probability of network KPI degradation given a set of input values including the number of faulty or uncalibrated branches and, in some embodiments, one or more additional parameters (e.g., cell or user beamforming weights, sector shape, or the like). The one or more values that represent the probability of network KPI degradation are then compared to a respective threshold(s) (e.g., probability threshold) to determine whether to raise an alarm.

In another embodiment, the trained ML model is used to select a data-driven threshold number of faulty or uncalibrated antenna branches above which network KPI is degraded (e.g., select a threshold number of faulty or uncalibrated antenna branches at and above which there is at least a threshold probability (e.g., 70%) of network KPI degradation). Then, during an inference phase, the number of faulty or uncalibrated branches is compared to the selected threshold to determine whether to raise an alarm. Note that the ML model may be trained, and thus the threshold selected, statically, semi-statically, or dynamically.

The systems and methods disclosed in the present disclosure may have the following advantages:

Reducing the number of false alarms due to HW or AC faults. A false alarm is defined as an alarm that is not associated with any KPI degradation.

Reducing the number of silent faults. A silent fault is defined as a KPI impacting fault that does not generate an alarm.

Reducing radio RR and NFF cases.

The present disclosure discloses a method of predicting a potential KPI impact in a radio system given a reported number of faulty/uncalibrated branches and optionally one or more additional parameters such as, e.g., cell or user beamforming weights, sector shape, or the like. The radio system may be, for example, a Distributed Unit (DU) of a base station (e.g., a gNB). In one embodiment, the method predicts the likelihood of KPI degradation given a number of faulty/uncalibrated branches and allows triggering HW/AC alarms only if the network KPI(s) are likely to be degraded.

Venn Diagrams with and without disclosed method are shown in FIG. 1. In the left circle of FIG. 1 (before optimization of the system), there can be false alarms when the radios not associated with a user plane's KPI degradation correspond to radios having a HW/AC threshold that is larger than a fixed threshold (e.g., 12.5%). After the system is optimized in accordance with embodiments of the present disclosure, radios associated with the network KPI degradation include all the radio units experiencing HW/AC issues; thus, there are no false alarms about the HW/AC issues.

Figure 2:
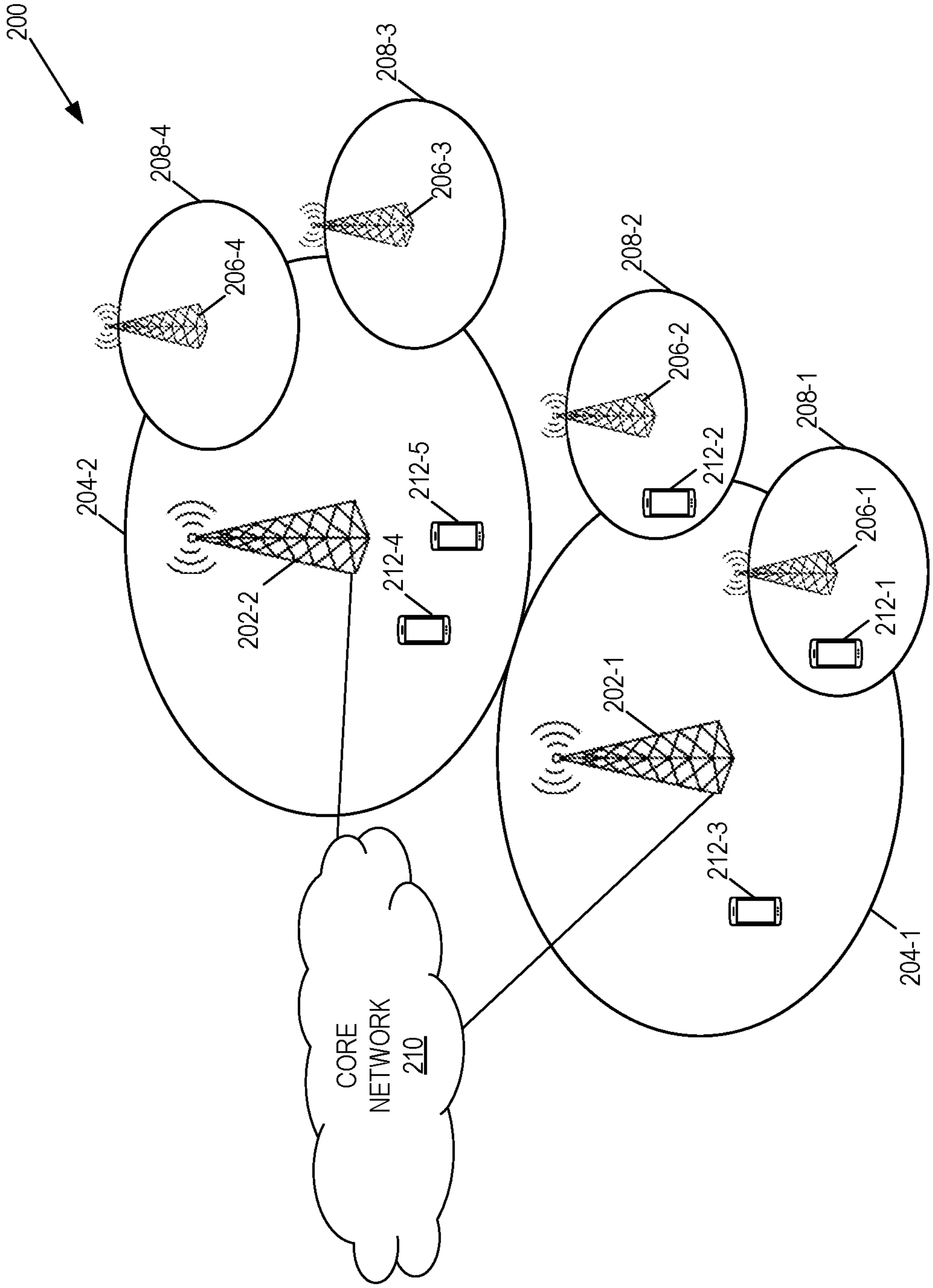
FIG. 2 illustrates one example of a cellular communications system according to some embodiments of the present disclosure.

Before describing solutions and corresponding embodiments proposed in the present disclosure, embodiments of cellular communication systems in which the solutions of the present disclosure may be implemented are first discussed. In this regard, FIG. 2 illustrates one example of a cellular communications system 200 in which embodiments of the present disclosure may be implemented. In the embodiments described herein, the cellular communications system 200 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 202-1 and 202-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which, in the 5GS, is referred to as the 5GC. The base stations 202 (and, optionally, the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

Figure 3:
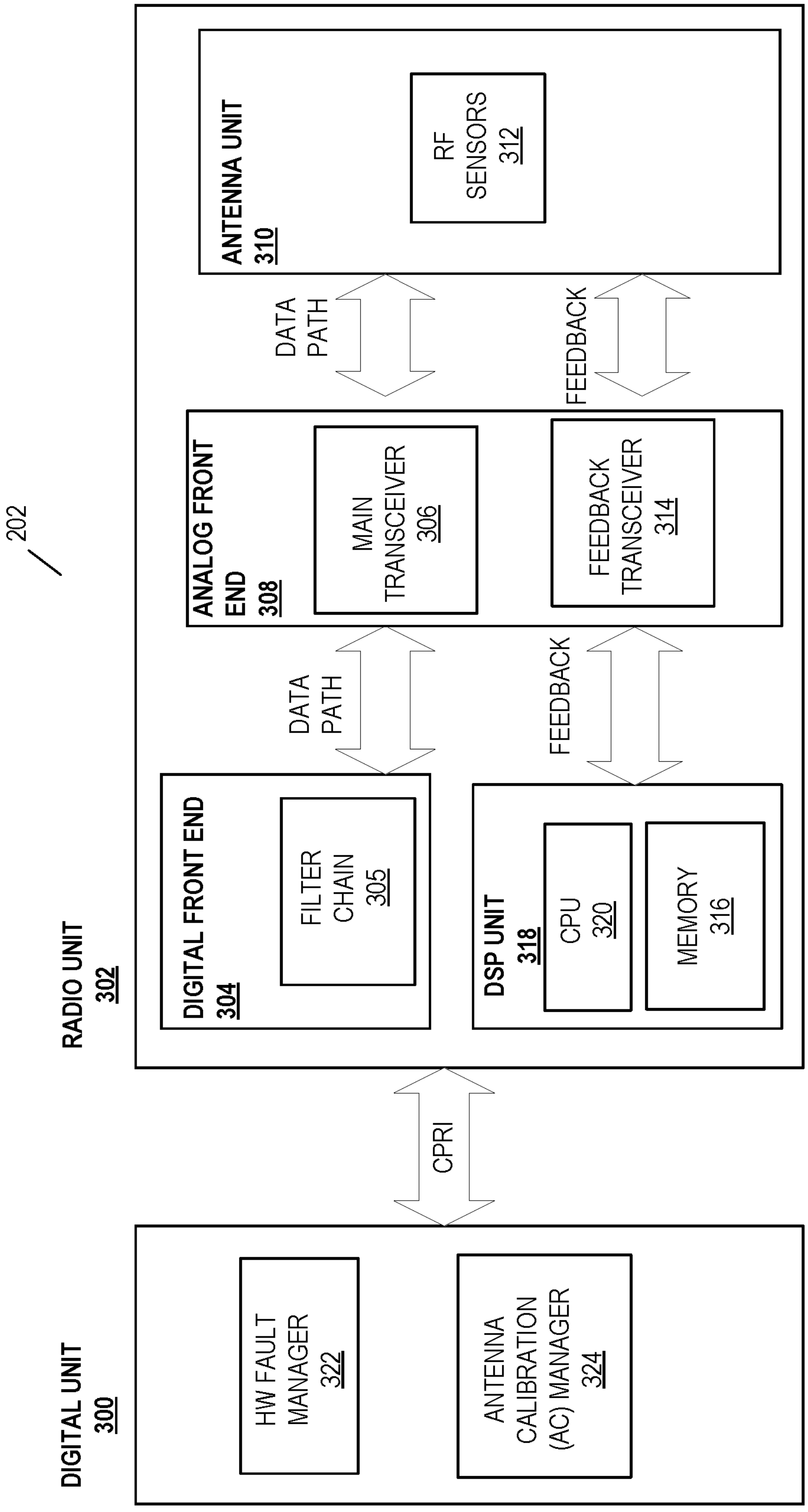
FIG. 3 illustrates a radio access network that includes a digital unit and a radio unit with hardware supervision and antenna calibration capabilities.

FIG. 3 illustrates one example of a base station 202 that includes a digital unit 300 and a radio unit 302. The systems and methods disclosed herein may be implemented in the base station 202 or similar RAN node. On the DL, the digital unit 300 injects specially designed data to a digital front end 304 in the radio unit 302, where the data is filtered, interpolated, equalized, and transformed to an analogue signal. The digital front end 304 includes a filter chain 305 to perform such actions on the data. The analogue signal is then upconverted, amplified, filtered by a main transceiver 306 in an analog front end 308, and radiated out by an antenna unit 310. The radiated signals are sensed by Radio Frequency (RF) sensors 312 and fed back to the radio.

The feedback signals are received, down converted, and digitized by a feedback transceiver 314 and captured into memory 316 in a Digital Signal Processor (DSP) unit 318. HW supervision and calibration procedures are run by a Central Processing Unit (CPU) 320 on the captured data. Faulty and uncalibrated branches are logged and reported to the digital unit 300, which generates an alarm when the probability of network KPI degradation exceeds a static, semi-static, or dynamic threshold or when the number of faulty and/or uncalibrated branches exceeds a static, semi-dynamic, or dynamic threshold that corresponds to a threshold probability of network KPI degradation, as described below. To perform such functions, the digital unit 300 includes a HW fault manager 322 and an AC manager 324. The HW fault manager 322 operates to monitor for and handle hardware faults and the AC manager 324 manages to monitor and report uncalibrated branches. Logging of faulty branches is performed by, in one example, the DSP unit 318.

The present disclosure is directed to embodiments of a method for utilizing (e.g., in the HW fault manager 322 and/or the AC manager 324) KPI-driven alarm thresholds based on ML. The solutions of present disclosure propose new data driven components with the following steps: (a) KPI selection, (b) data collection, pre-processing, and alignment steps, (c) KPI labeling, (d) imbalanced data handling, and (e) alarm threshold optimization.

Figure 4:
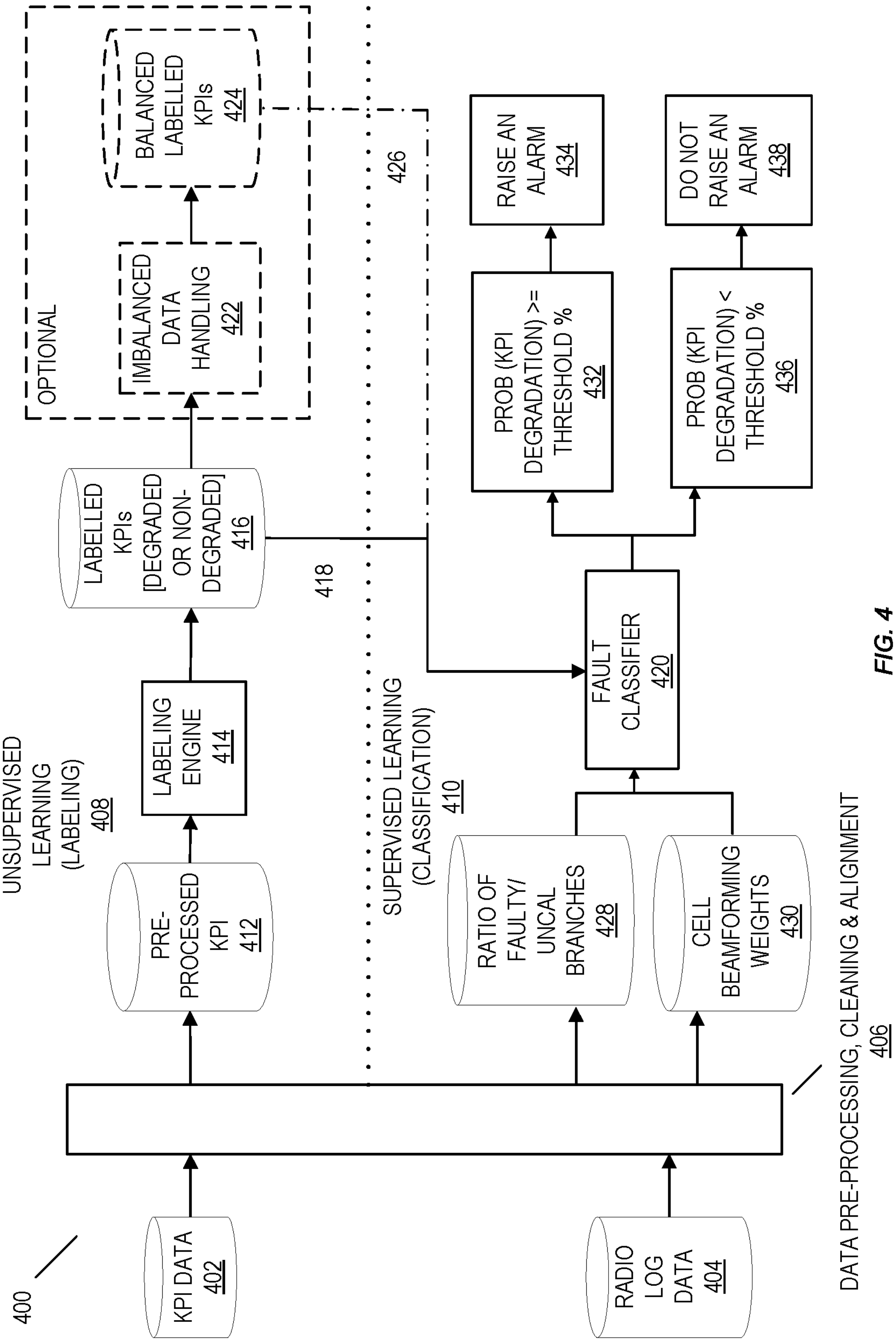
FIG. 4 illustrates a block diagram of solutions proposed in the present disclosure.

FIG. 4 illustrates a block diagram of a procedure 400 in accordance with one example embodiment of the present disclosure. In one embodiment, the HW fault manager 322, the AC manager 324, and the DSP unit 318 (including the CPU 320 and the memory 316) of FIG. 3, alone or in combination, implement the procedure 400 illustrated in FIG. 4. Note, however, that this is only one example implementation. In another embodiment, the procedure 400 illustrated in FIG. 4 may be performed in the digital unit 300 of FIG. 3. In another example embodiment, model training aspects may be performed offline, e.g., by another node (e.g., an OSS node).

During a training phase, the process uses, at its inputs, network KPI data 402 and radio log data 404. The KPI data 402 includes data about one or more network KPIS. The radio log data 404 includes data such as, e.g., the number or ratio of faulty or uncalibrated branches, cell or user beamforming weights, user-specific beamforming weights, etc. In one example embodiment, the KPI data 402 and the radio log data 404 are stored in a storage such as the memory 316. Note, however, that this is only an example. The KPI data 402 and/or the radio log data 404 may alternative be obtained from an external source.

During training, the KPI data 402 and the radio log data 404 are pre-processed, cleaned, and aligned in step 406 to provide pre-processed KPI data 412 and pre-processed radio log data, which in the illustrated example includes data about the ratio of faulty or uncalibrated branches 428 to the total number of antenna branches and cell or user beamforming weights 430. The pre-processed KPI data 412 is further processed in an unsupervised learning (labeling) process 408, which in the illustrated example is performed by labelling engine 214, to thereby provide labelled KPIS 416 in which each KPI is labelled as either degraded or non-degraded. Optionally, the labelled KPIS 416 are further processed by an imbalanced data handling function 422 to provided balanced, labelled KPIs 424. During a training phase, the pre-processed radio log data (i.e., data 428 and 430) together with the labelled KPIs 416 or the balanced, labelled KPIS 424 are further processed in a supervised learning (classification) process 410 to train a fault classifier 420. The fault classifier 420 is trained to output a value(s) that indicate a likelihood that network KPI will be degraded given input set of radio data (e.g., a number or ratio of faulty or uncalibrated branches and, in this example, the cell or user beamforming weights).

Thereafter, during an execution or inference phase, the fault classifier 420 receives a set of inputs including, in this example, the number or ratio of faulty/uncalibrated branches and cell or user beamforming weights and outputs a value(s) that is indicative of a probability of network KPI degradation given this set of inputs. As shown in 432, if this probability is greater than or equal to a threshold, an alarm is raised in step 434. Otherwise, if this probability is less than the threshold (step 436), then no alarm is raised in step 438. Note that the threshold may be static, semi-static, or dynamic. Further, the threshold may be determined or learn during the training process and from the KPI data 402 and the radio log data 404. Note that, in the illustrated embodiment, the fault classifier 420 uses the trained ML model to obtain the value(s) indicative of the probability of network KPI degradation given the set of inputs, and then the probability of network KPI degradation is compared to the threshold to determine whether to raise an alarm. However, in another embodiment, the trained ML model is used to select a threshold number of faulty or uncalibrated branches that corresponds to a threshold probability of KPI degradation, and the fault classifier 420 then compares the number of faulty or uncalibrated branches input to the fault classifier 420 to the threshold number of faulty to uncalibrated branches to determine whether to raise an alarm.

Details of the above steps in FIG. 4 are further described below.

1. KPI Selection

This section describes aspects related to what network KPIs are included in the KPI data 402 used in the procedure of FIG. 4. In a cellular communications network or system such as that of FIG. 2, there is a multitude of KPIs indicating network performance. Many of those KPIs are highly correlated and do not provide additional information to be learned by ML models. Using highly correlated KPIs may confuse the models. In embodiments of the disclosed solutions, only a subset of coverage and capacity related KPIs is used for labeling. Examples of KPI selection techniques when no target variable is available are given below:

(1) Dropping highly correlated KPIS
(2) Keeping the KPIs that provide the highest variance
(3) Using dimensionality reduction techniques to reduce the number of features, dimensionality reduction gives the features that explain the most about the dataset. In one embodiment, the techniques used for the dimensionality reduction are: Principal Component Analysis (PCA) and Linear discriminant analysis.
(4) Keeping the features with highest ratio of arithmetic mean over geometric mean
(5) One or more of the steps (1) to (4) can be chosen and based on majority voting choose subset of important features.

An example of a feature list identified from domain knowledge expertise related to the problem at hand are:

(1) Uplink (UL) Spectral Efficiency (bps/Hz/cell)
(2) Channel Quality Indicator (CQI)
(3) Medium Access Control (MAC) Downlink (DL) Block Error Rate (BLER) (%)
(4) DL Packet Loss Rate (%)
(5) DL Spectral Efficiency (bps/Hz/cell)
(6) UL Physical Resource Block (PRB) utilization (%)
(7) Peak number of Radio Resource Control (RRC) Connected users per cell
(8) UL Packet Loss Rate (%)
(9) DL Packet Loss Rate Overall (%)
(10) Physical Uplink Control Channel (PUCCH) signal-to-interference-and-noise ratio (SINR)
(11) DL PRB utilization (%)
(12) UL User Throughput (M bit-per-second (bps))
(13) Average UL PRB Utilization (%)
(14) S1 Signaling Setup Success Rate (%)
(15) MAC UL BLER (%)
(16) Retainability (%)
(17) Average DL PRB Utilization (%)
(18) DL User Throughput (Mbps)
(19) DL Cell Throughput (Mbps)
(20) Average number of DL Active Users
(21) Physical Uplink Shared Channel (PUSCH) SINR
(22) UL Cell Throughput (Mbps)
(23) Average number of UL Active Users In one embodiment, a short list of KPIs that are kept after elimination of highly correlated features is:

(2) CQI
(3) MAC DL BLER (%)
(4) DL Packet Loss Rate (%)
(8) UL Packet Loss Rate (%)
(15) MAC UL BLER (%)
(19) DL Cell Throughput (Mbps)
(22) UL Cell Throughput (Mbps)

Embodiments of the present disclosure may utilize one or more of the KPIs in the short list of KPIs above.

2. Data Collection and Pre-Processing

Figure 5:
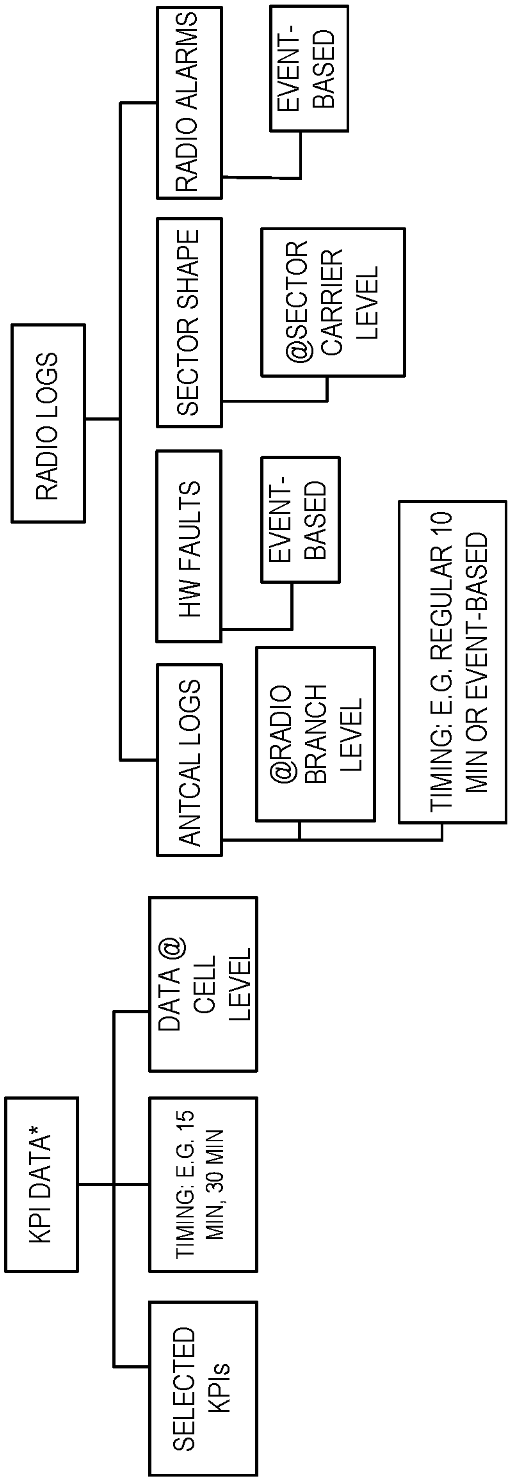
FIG. 5 illustrates data collection process of the solutions proposed in the present disclosure.

FIG. 5 illustrates data collection process of the solutions proposed in the present disclosure. The data collection process in FIG. 5 corresponds to the pre-processing step 406 in FIG. 4. The two data sources (KPI data and the radio logs) are collected simultaneously and time-aligned with one another. For example, the KPI data are collected from (network level) simulation, Cell Tracing Records (CTRs), or Performance Measurement (PM) counters. The first data source is KPI data that can be collected from, for example, (1) network level simulation, (2) CTR data which can be aggregated in desired intervals, or (3) PM counters that the Network Element (NE) periodically uploads to the Operations Support System (OSS) in the Operation and Maintenance (O&M) site. The base station 202 (e.g., an eNB or a gNB) performance can be indicated by both the raw PM counter values as well as calculated KPIs based on designed formulas. Network operators use many different types of KPIs to analyze the network behavior and diagnose problems. In case of data collected from PM counters, time duration of PM statistics collection before uploading to the OSS is normally configurable. Some of the typical options are 15 min, 30 min, and 60 min.

The second data source is the radio logs comprising AC logs, HW faults, and sector shapes. This data may be logged and available at different time intervals as the KPIS. Therefore, it is necessary to time-align the collected data from the two sources.

Collected data from these two sources may be at different levels. For example, KPIs are at cell level, cluster level, or network level, whereas the radio logs are at the radio unit level. Thus, it is important to pre-process the data and convert them into the same level.

2.1. Data Cleaning and Alignment

Figure 6:
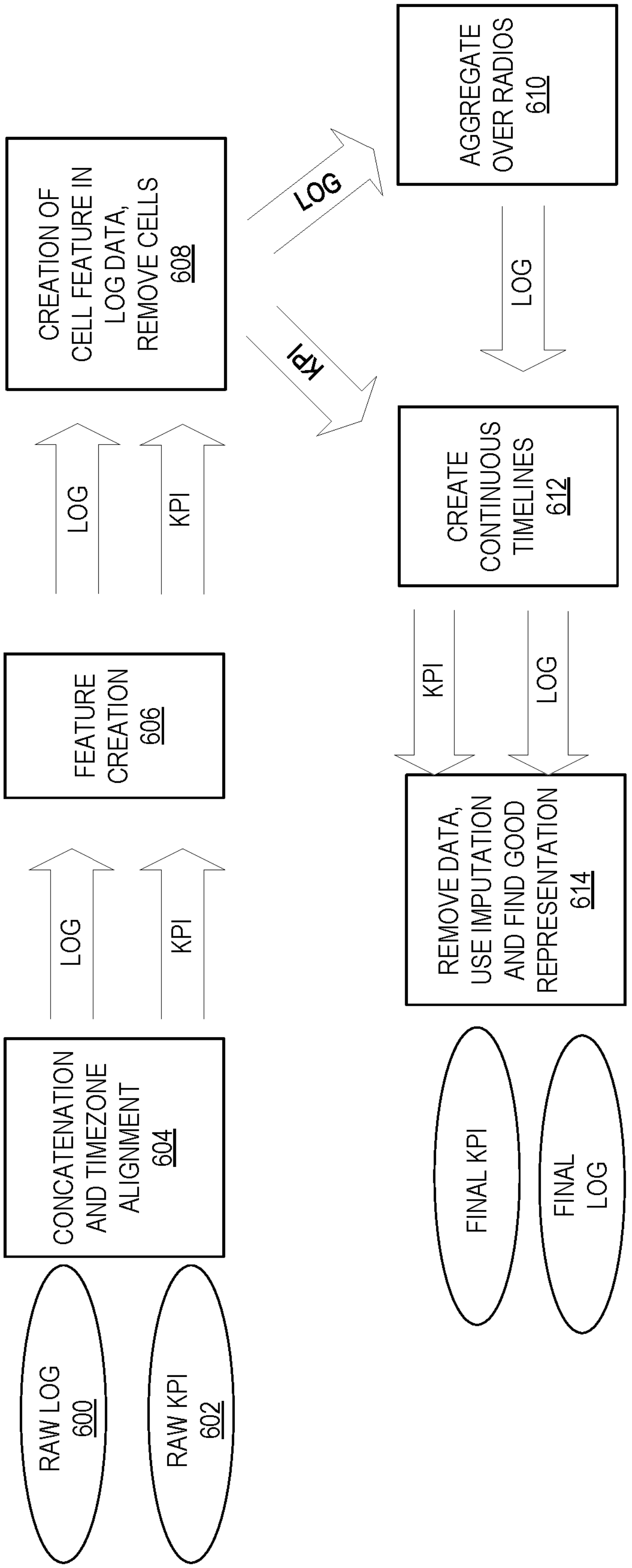
FIG. 6 illustrates a flow chart of data processing and data alignment in the solutions proposed in the present disclosure.

FIG. 6 illustrates a flow chart of data cleaning and data alignment in one embodiment of the solutions proposed in the present disclosure. The steps of FIG. 6 may be performed in step 406 of FIG. 4. Note that RAW log data 600 of FIG. 6 corresponds to the radio log data 404 of FIG. 4, and RAW KPI data 602 of FIG. 6 corresponds to the KPI data 402 of FIG. 4.

Having data from two separate sources requires processing and alignment. For the threshold optimization to make sense, the KPI data and radio log data should be on the same time scale. This can be a challenge because these two types of data are reported in different manners—KPIs are on periodic report frequencies, whereas radio log data is reported in an event-based manner on one level, and with a given report frequency on another level. This frequency cannot be assumed to be the same as the one for KPI logging, neither can it be assumed that the frequencies will have a common denominator.

Figure 7:
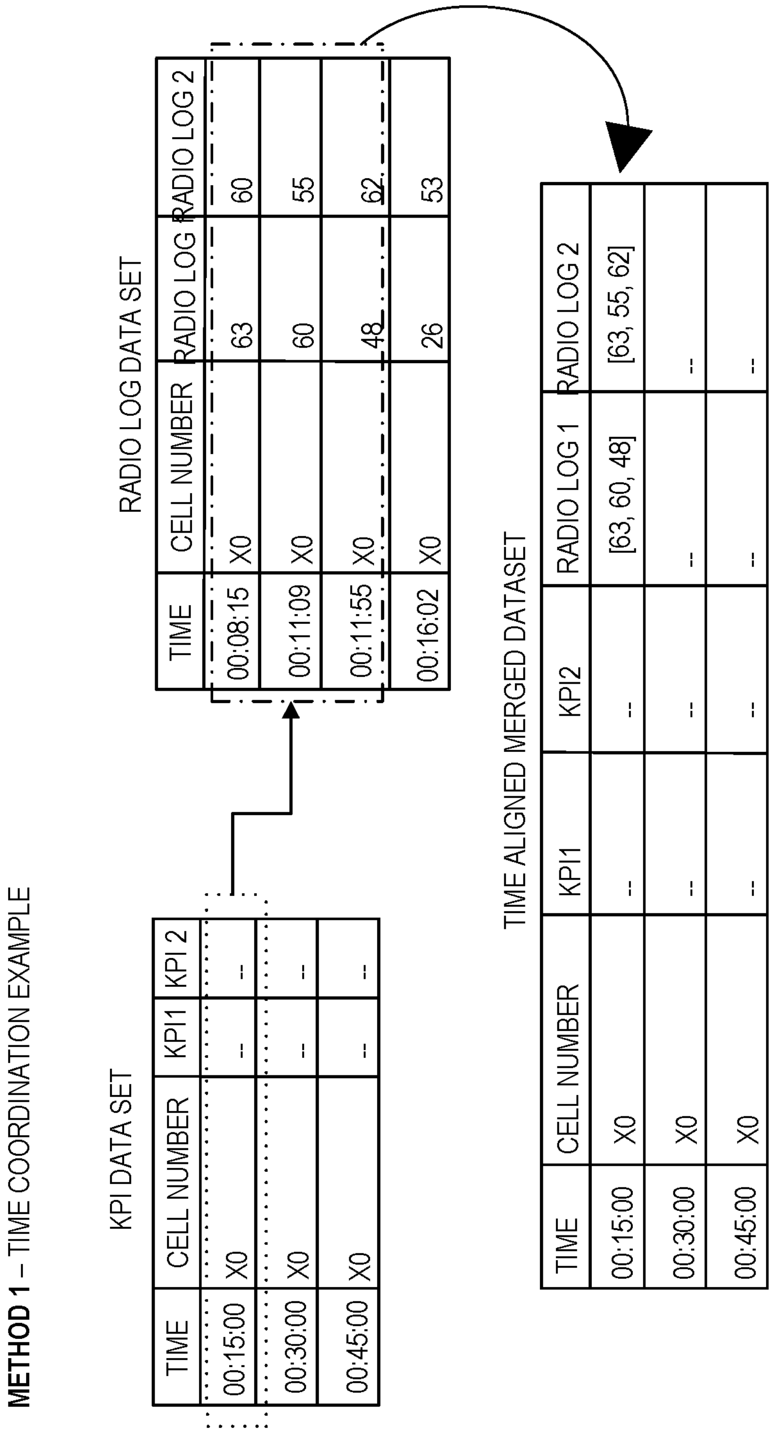
FIG. 7 illustrates a first method for aggregating metrics over a common time frame in accordance with some embodiments of the present disclosure.

An example would be where KPIS are reported at 15-minute intervals and radio log data is reported at 10-minute intervals. The smallest common frequency would then be 30 minutes. The time granularity of the final dataset will then need to be coarser than both original datasets. The challenge of this will be to find a way to represent everything that has happened during the common time interval with one metric. Depending on how many data entries are available during the time interval (2 for KPI and >6 for radio logs in the case of 10 minute frequency for radio log data, 15 frequency for KPI data and 30 min as a common report frequency), the following example methods are disclosed:

Method 1: In one example, the sequence of faults is used as a sequence for time series representation. FIG. 7 illustrates the method 1 for aggregating metrics over a common time frame.

Figure 8:
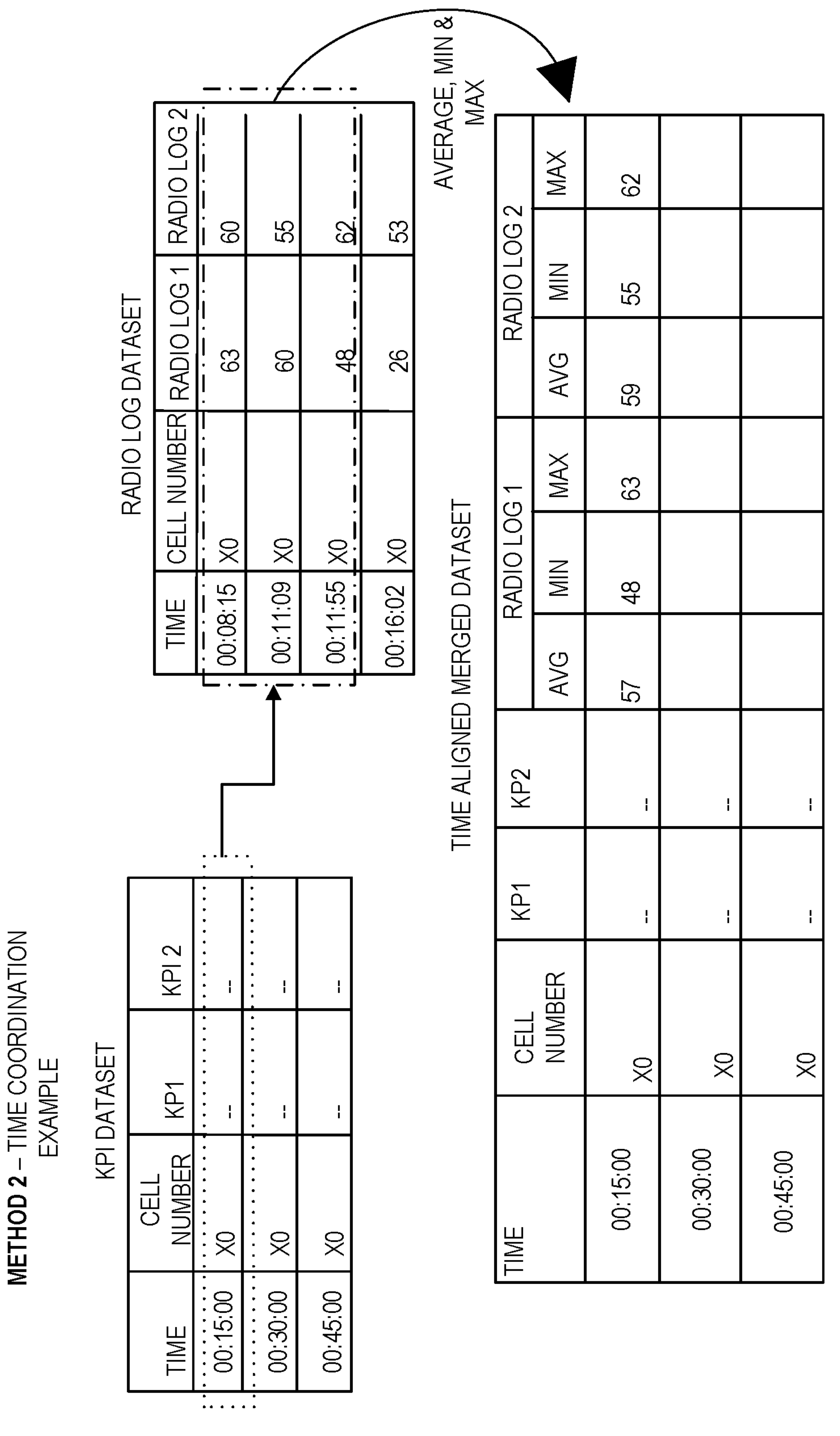
FIG. 8 illustrates a second method for aggregating metrics over a common time frame in accordance with some embodiments of the present disclosure.

Method 2: In another example, all entries in given time window can be averaged, or/and take the maximum, the minimum, the standard deviation, or a vector representation. FIG. 8 illustrates the method 2 for aggregating metrics over a common time frame.

In one embodiment, the selection between method 1 and method 2 above is based on the classifier method for the threshold optimization. For example, if the classifier is a neural network, such as Long Short-Term Memory (LSTM), the method 1 can be chosen but for a tree-based classifier method 2 is more suitable.

The datasets may be aligned not only on time, but on other features as well. An example of another alignment issue would be that one dataset could be reported on branch level while another is reported on cell level. Other features in the dataset are needed to map the datasets to the same level in those cases.

FIG. 6 illustrates one example procedure for aligning and pre-processing (raw) KPI and radio log data in accordance with one embodiment of the present disclosure. As illustrated, the steps of FIG. 6 are as follows:

(1) Concatenation and time zone alignment (step 604): The data is received in chunks from only parts of the period decided, or only from parts of the geographical locations decided. These need to be concatenated. Before concatenation, all data outside the decided period is removed. Time zones are aligned.

(2) Feature creation (step 606): Many features need to be adapted to be able to be used. Some examples of features that need to be aligned or created is to use a common unit for frequency and translate the calibration state (e.g., calibrated for uncalibrated for each antenna branch) which is a categorical variable from a string to a binary variable.

(3) Creation of cell features in radio log data, remove cells (step 608): Since radio log data is reported on branch level, we do not have the notion of the cell which is needed to align it with KPI data. Each unique node (e.g., each unique base station including a radio unit(s) and a digital unit), frequency, and radio maps to a unique cell, and that mapping can be found in the KPI data. Joining the datasets on these variables will give us the notion of cell in the radio log data. Before this in this inner join, all cells that are not in both datasets will be dropped.

(4) Aggregation over radios (step 610): Radio log data is reported on a branch level with a binary report on the calibration state of corresponding branch. To align it with the KPI data, this is summed up over each radio to instead get a ratio of how many of the branches are calibrated, and only one sample per timestamp and cell. In the figure, only the radio log data passes this step, but if any cells are found to not have reports from all branches, these cells need to be removed from both datasets.

(5) Create continuous timelines (step 612): As radio log data is reported both events based and on, e.g., a 10-minute level, whereas KPI data is reported on a e.g., 15-minute level, the data needs to be aligned to a common time frame. When getting data into this time frame, all time intervals that do not contain any data will be filled with Not-a-Number (NaN)-rows (i.e., elements in the dataset that do not contain a value, but are not empty). The data reported during a time frame should be represented by a vector containing all reports from the time frame.

(6) Removal and imputation (step 614): The NaN-rows will disturb the ML process if not handled. Time frames in the beginning and end of the dataset are removed if more than a chosen number (e.g., 100) of cells lack data from there. If cells are lacking more than a given percentage (e.g., 20%) of the data cells are dropped. The dataset will be both shorter and contain fewer cells. If any NaN-rows are left after this process, some imputation method (i.e., some method to mitigate the missing data) needs to be used. If the vectors for the time frames cannot be used for the ML methods, some metric that can represent the entire time frame needs to be used, such as mean, max, min, std or some other statistic metric. Suggestion on the best ways to represent the occurrences from the entire time frame can be found in FIG. 7 and FIG. 8. In FIG. 7, the KPI data set includes KPI1 and KPI2 at the time instance, 00:15:00, for the cell (X0) and the radio log data set has the set of radio log 1 (63, 60, 48) and the set of radio log 2 (60, 55, 62). After the KPI data set and the radio log data sets are processed, the values of the KPI data set (KPI1 and KPI2) and the values of the radio log data sets (63, 60, 48; 60, 55, 62) are aligned for the same time instance, 00:15:00. In FIG. 8, after the KPI data set and the radio log data sets are processed, the values of the radio log data sets (63, 60, 48; 60, 55, 62) are converted to their averages (57; 59), minimums (48; 55), and maximums (63; 62).

3. KPI Labeling

The step of KPI labeling is illustrated in the step 414 ("labeling engine") of FIG. 4. In this step, pre-processed short listed KPIs are quantified, or labeled, such that the resulting KPI labels are associated to the preprocessed radio logs in the final dataset. In one embodiment, the KPIs as labelled as degraded or non-degraded.

To label KPIs as degraded and non-degraded, anomalous behavior among KPIs is preferably captured. One way is to track only several main KPIS and determine the anomalous behavior one by one and then take the majority vote among label of all KPIs in the list. However, this ignores tight relation among KPIs that needs to be captured in order to have high quality labels. Another embodiment is based on unsupervised multivariate techniques to catch relations between KPIs to automatically analyze thousands of cells with hundreds of their behavioral and contextual features reflected in KPIs, to identify the samples or time duration in the cell with deviant behavior. An example of this could be isolation forest technique or One class Support Vector Machine (SVM. To catch context and time dependencies, one option is to, in addition to KPI features, add a numerical index for each cell, weekday, and hour of the day. Another option is to transform features to cyclic information such as sine and cosine wave, and use them in the related methods.

Another embodiment for labeling KPIs is using an unsupervised clustering technique. Since degradation is not normal behavior and does not happen often the data set will be skewed, meaning that the normal behaving cluster will be a lot bigger. Examples of methods for this could be variations of Density Based Scan (DBSCAN), Hierarchical Density Based Scan (HDBSCAN), and Gaussian mixture models. To catch context and time dependencies, the same policies as above applies too.

Another example is to use techniques that leverage both unsupervised and supervised learning. In this case, the labeling is done in two stages. As an example, in stage one, any unsupervised technique, such as anomaly detection or clustering, is used and an autoencoder is used to label the data. In step two, only the portion of label samples of which we are the surest of the label given by the chosen method are separated out. In stage two, the data may be separated based on, e.g., a predefined threshold, or similarity score, or data that is close to the mean, etc. This data is used as training data with a supervised learning technique, with which the label of the rest of the data set is determined. Combining an unsupervised learning technique with supervised learning like this is usually referred to as semi-supervised learning or active learning.

The last example is that we train a model only on KPIs that are normal or there is no alarm happening in the log level through an autoencoder. Then in inference time, we use the cells with HW and AC problems or deviant KPIs to be labeled as degraded.

4. Imbalanced Data Handling

The step of imbalanced data handling is illustrated in the step 422 of FIG. 4. There are two sources of imbalance in the new aligned and transformed dataset.

First, skewed features. If the transformed features described in the above section 2 ("Data collection and pre-processing") from log files are skewed because the faults are event driven and cannot be guaranteed that many get collected in the dataset, they can be transformed through log transformation, square root transform or Box-Cox transform.

Second, imbalanced labels. If labeled KPIs samples are severely imbalanced will pose a significant challenge for achieving high precision and high recall. Imbalanced labels can create both problem of information lacking and information bias. Therefore, it needs to be handled beforehand. Two ways to resolve this issue are either through the data (as shown with the optional section in block diagram of FIG. 4) or through the algorithm.

The examples of Data-based techniques involve: (a) Over-sampling: is to increase the artificial data from the minority for the algorithm to learn; (b) Under-sampling: It focuses on compressing or reducing the exceeded data of the majority classes; and (c) Combine-Sampling: As the name implies, it combines Over-Sampling and Under-Sampling at the same time.

Algorithm-Based techniques involve adjusting hyperparameters and boosting the ML model such techniques can be expressed as:

Model Spotting: Increasing the variety of models in the imbalanced data project is very important due to not all the algorithms being equally applicable for the imbalanced data. The common methods are the Tree-based algorithms or Support Vector Machine or ensemble learning (e.g., Balanced Bagging Classifier, Balanced Random Forest Classifier).

Penalize the Algorithm: Penalization can force the algorithm to spend more effort to learn from minority classes, Logistic Regression or Ridge Classifier, etc.

5. Alarm Threshold Optimization

In one embodiment, alarm threshold optimization may be implemented by the fault classifier 420 shown in FIG. 4. The proposed solution is based on using a classifier (e.g., the fault classifier 420) that distinguishes non-critical faults versus critical faults using ML-based classification techniques. In one embodiment, the training data are composed of the following input and output features:

Input features:

- Transformed features of the number of faulty or uncalibrated branches per radio unit as described above in section 2 ("Data collection and pre-processing");
- Cell or user beamforming weights Output features: KPI label (degraded or non-degraded), as described above.

5.1. Fault and Alarm Classification

The fault and alarm classification (e.g., at steps 432 and 436 of FIG. 4) can be performed with thresholds (e.g., either a threshold probability of KPI degradation or a corresponding threshold number of faulty or uncalibrated branches) at three different levels:

- Data-driven static threshold: A fixed threshold is chosen based on the analysis of the results from the trained fault classifier to ensure low false positive and negative alarms. The selected threshold is then deployed without any update in the product.
- Data-driven semi-dynamic threshold: This threshold is chosen similar to the static threshold with the difference that the threshold is updated in the product with a desired frequency (e.g., every 3 months, 6 months) to capture the changes in the network or product and to ensure that the threshold remains optimal.
- Data-driven dynamic threshold: At this level, a trained and verified model of the fault classifier is deployed in the product to infer the right threshold and make decisions about raising an alarm dynamically on the fly.

For static and semi-dynamic thresholds, the models (i.e., the model implemented by the labelling engine 414 and the model implemented by the fault classifier 420) are trained offline and the chosen threshold is implemented in the product. For the dynamic threshold, the model can be trained offline or online. If the model is trained offline, the model can be also fine-tuned in the network, if online training is available.

5.2. Training

With the input and output features outlined above, the fault classifier 420 can be developed as shown in FIG. 4 using Supervised Learning techniques. Suggested techniques are including but not limited to tree-based methods (e.g., Decision Tree, Random Forest), Linear models (e.g., Logistic Regression, Support Vector Machines), k-Nearest Neighbor (kNN), and Neural Networks.

The trained model can estimate the class of the fault as being either critical (KPI degraded) or non-critical (KPI non-degraded). The model can also estimate the probability of a KPI degradation due to faulty or uncalibrated antenna branches given the cell or user beamforming weights.

5.3. Inference

In one embodiment, for the data-driven dynamic threshold optimization, the trained model is deployed in the product and used to decide if an alarm needs to be raised due to a HW fault or uncalibrated antennas. If the estimated probability is too high (e.g., higher than a threshold) or if the number of faulty or uncalibrated branches is higher than the threshold number of faulty or uncalibrated branches that corresponds to a threshold probability of KPI degradation) indicating that the fault is critical, an alarm should be raised. If the estimated probability is negligible indicating that the fault is non-critical, no alarms need to be raised.

Additional Description

Figure 9:
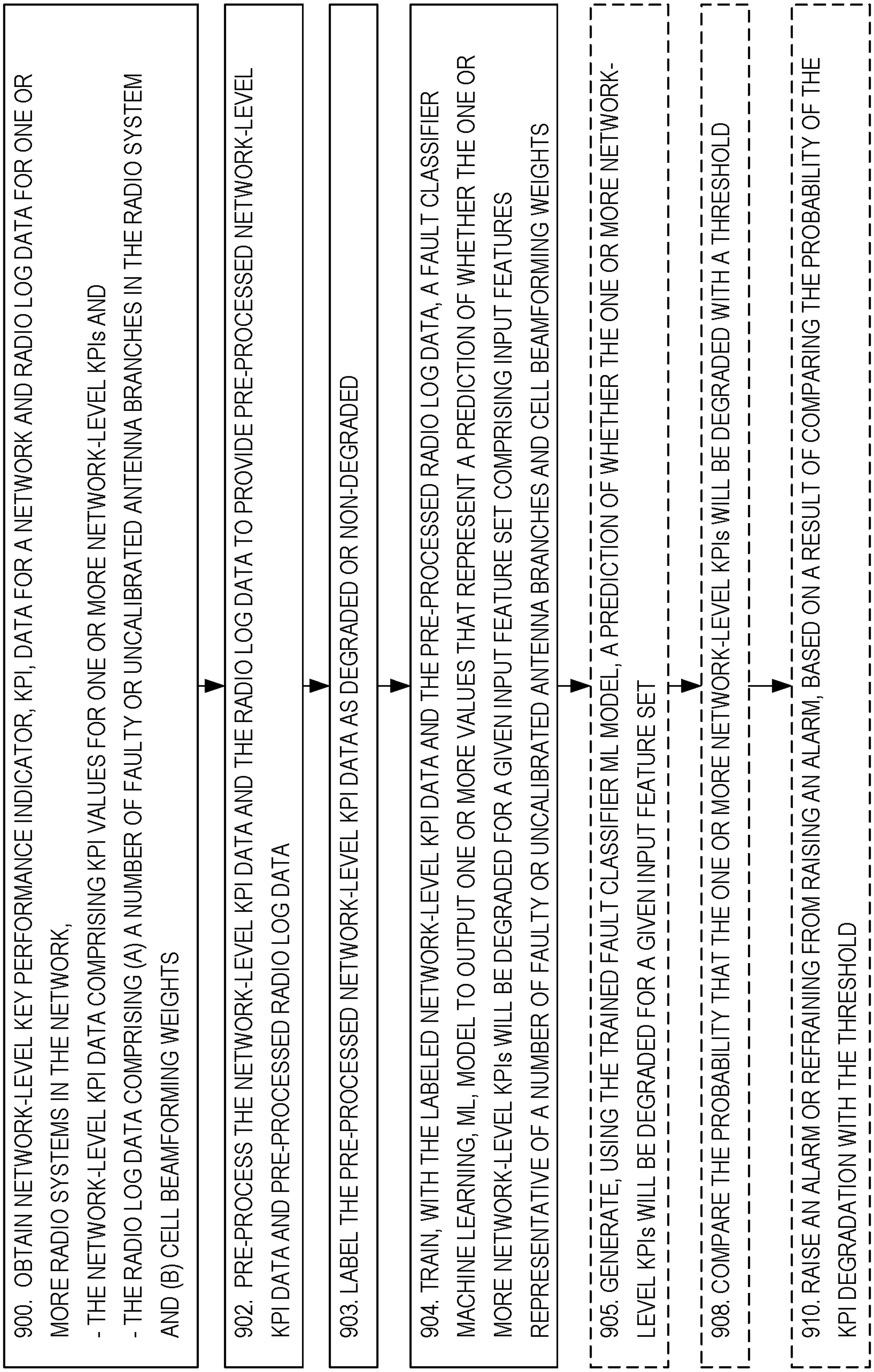
FIG. 9 illustrates a flow diagram of some embodiments of the present disclosure.

FIG. 9 is a flow chart that illustrates a process for training and using a ML model for predicting whether network KPI(s) will be degraded based on radio-level input features including the number of faulty or uncalibrated antenna elements and, optionally, one or more other radio-level parameters such as, e.g., beamforming weights, in accordance with one embodiment of the present disclosure. The process in FIG. 9 includes a training phase (steps 900-904) and an inference phase (steps 905-910). In one embodiment, both the training phase and the inference phase are performed by the same node, e.g., a radio access node 1000 (e.g., a base station 202). In another embodiment, the training phase and the inference phase are performed by different nodes. For example, the training phase may be performed offline via a computing node, which may be part of the cellular communications system or separate from the cellular communications system, and the inference phase is performed by a radio access node 1002 (e.g., a base station 202) or a component (e.g., Digital Unit (DU) of a base station 202).

In step 900, the training node (e.g., radio access node or separate computing node) obtains (i) network-level KPI data for a network and (ii) radio log data for one or more radio systems in the network. The network-level KPI data includes KPI values for one or more network-level KPIs and the radio log data includes (a) a number of faulty or uncalibrated antenna branches in the radio system and (b) cell or user beamforming weights. Optionally, the radio log data further includes a sector shape or user-specific beamforming weights. Note that the sector shape and user-specific beamforming weights carry the same information. The KPI data and the radio log data are illustrated in FIG. 5.

As discussed above, selecting the network-level KPI data for a network can be done in multiple ways: dropping highly correlated KPIs, keeping the KPIs that provide the highest variance, using Dimensionality Reduction techniques to reduce the number of features, and keeping the features with highest ratio of arithmetic mean over geometric mean. Note that the details described above regarding KPI selection are equally applicable here.

Examples of the network-level KPI data for a network (that may be selected based on one of the above ways) are CQI, MAC DL BLER (%), DL Packet Loss Rate (%), UL Packet Loss Rate (%), MAC UL BLER (%), DL Cell Throughput (Mbps), and UL Cell Throughput (Mbps). The network-level KPI data for a network can be collected from (1) network level simulation, (2) CTR data which can be aggregated in desired intervals, or (3) PM counters that the NE periodically uploads to the OSS in the O&M site.

The radio log data for one or more radio systems in the network may include AC logs, HW faults, sector shapes and radio alarms. The radio log data may be logged and available at different time intervals as the KPIS. Therefore, it is necessary to time align the collected data from two sources, as described below (step 902). Also, the two sources of the data, KPIs and the radio log data may be at different levels. For example, KPIs are at cell, cluster, or network level, whereas the radios log data are at the radio unit level. Thus, it is important to pre-process the data and convert them into the same level, as described below (step 902).

In step 902, the training node performs pre-processing of the network-level KPI data and the radio log data to provide pre-processed network-level KPI data and pre-processed radio log data. For example, the pre-processing includes (i) time-aligning the network-level KPI data with the radio log data, (ii) transforming the network-level KPI data into a first set of features that is usable by the fault classifier ML model, (iii) transforming the radio log data into a second set of features that is usable by the fault classifier ML model. The first set of features corresponds to the pre-processed network-level KPI data, and the second set of features corresponds to the pre-processed radio log data.

The pre-processing of the network-level KPI data and the radio log data is illustrated in FIG. 6. Also, the method 1 and the method 2 of the pre-processing are illustrated in FIG. 7 and FIG. 8, respectively, and described above.

As illustrated in FIG. 6, the pre-processing includes (i) time-aligning the network-level KPI data with the radio log data. That is, the raw KPI data and the raw radio log data are concatenated and time-aligned ("concatenation and timezone alignment").

The pre-processing also includes (ii) transforming the network-level KPI data into a first set of features that is usable by the fault classifier ML model. That is, in one embodiment, the KPI data (output by "concatenation and timezone alignment") is processed through the steps of "feature creation," "creation of cell features in radio log data, remove cells," "create continuous timelines," and "removal and imputation." Details of those transforming step are described above.

The pre-processing further includes (iii) transforming the radio log data into a second set of features that is usable by the fault classifier ML model. That is, similar to the KPI data, the radio log data (output by "concatenation and timezone alignment") are processed through the steps of "feature creation," "creation of cell features in radio log data, remove cells," "aggregation over radios," "create continuous timelines," and "removal and imputation."

In step 903, the training node labels the pre-processed network-level KPI data as degraded or non-degraded. The pre-processed (e.g., short listed) KPI data (in step 902) are associated to the preprocessed radio log data (in step 902) in the final dataset. To label the pre-processed KPI data as degraded or non-graded, multiple solutions to capture anomalous behavior among the KPI data may be used: (a) tracking only several main KPI data and determine the anomalous behavior one by one and then take the majority vote among label of all KPI data in the list, (b) unsupervised multivariate techniques to catch relations between KPI data to automatically analyze thousands of cells with hundreds of their behavioral and contextual features reflected in KPI data, (c) an unsupervised clustering technique, (d) techniques that leverage both unsupervised and supervised learning, and (e) training a model only on KPIs that are normal. Details of the multiple solutions are described above.

In step 904, the training node trains, with the labeled network-level KPI data and the pre-processed radio log data, a fault classifier ML model to output one or more values that represent a prediction of whether the one or more network-level KPIS will be degraded for a given input feature set. The given input feature set includes input features that are representative of a number of faulty or uncalibrated antenna branches and cell or user beamforming weights. The one or more values that represent the prediction include a bit that (a) indicates that the one or more network-level KPIS will be degraded when the bit is set to a first binary value and (b) indicates that the one or more network-level KPIS will not be degraded when the bit is set to a second binary value.

That is, the trained fault classifier ML model can estimate the class of the fault as being either critical (KPI degraded) or non-critical (KPI non-degraded). Examples of the fault classifier ML model are Decision Tree, Random Forest, Linear models (e.g., Logistic Regression, Support Vector Machines), kNN, and Neural Networks.

During the inference phase, in step 905, optionally, the radio access node generates, using the trained fault classifier ML model, a prediction of whether the one or more network-level KPIs will be degraded for the given input feature set.

Alternatively, the one or more values that represent the prediction include one or more values that represent a probability that the one or more network-level KPIS will be degraded for the given input feature set. In other words, the trained fault classifier ML model can also estimate the probability of a KPI degradation due to faulty or uncalibrated antenna branches for the given input feature set (e.g., the cell or user beamforming weights.)

Optionally, in step 908 and step 910, the radio access node compares the probability that the one or more network-level KPIs will be degraded with a threshold and raises an alarm or refraining from raising an alarm, based on a result of comparing the probability of the KPI degradation with the threshold. In one example embodiment, the comparison is a comparison of the number of faulty or uncalibrated antenna branches to a threshold number of faulty or uncalibrated antenna branches. In either case, the threshold may be (a) a static threshold, (b) a semi-dynamic threshold, or (c) a dynamic threshold. The threshold may be determined to minimize a probability of a false negative case given a probability of a false positive case, the false negative case is being missing a detection of faulty or uncalibrated antenna branches and the false positive case is being raising a false alarm. For example, it is up to an operator or a designer of the system to determine the false positive probability based on acceptable NFF rate.

Figure 10:
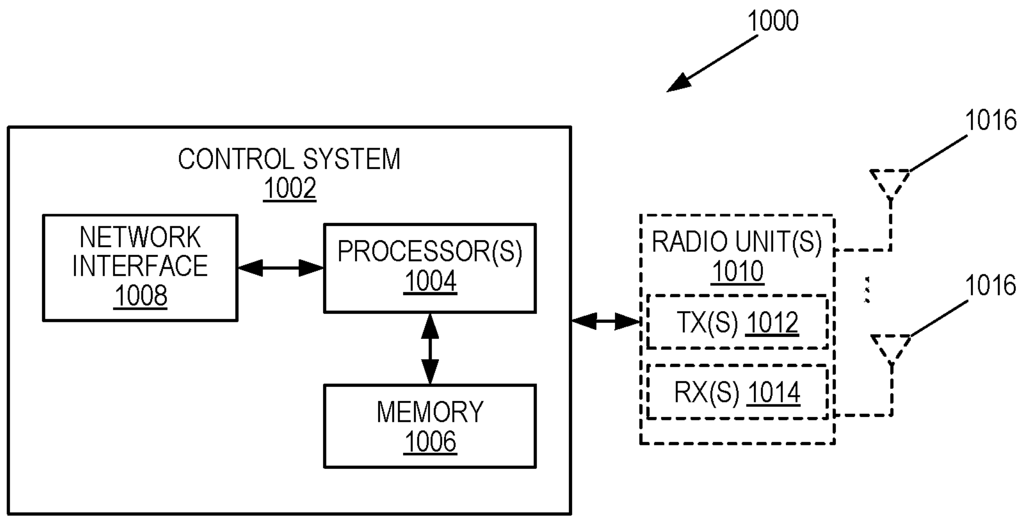
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 202 or 206 or a network node that implements all or part of the functionality of the base station 202 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. The radio access node 1000 includes, in one example embodiment, the digital unit 300 having the HW fault manager 322 and the AC manager 324, which are illustrated in FIG. 3 and described above.

In addition, the radio access node 1000 may include one or more radio units 1010 (e.g., radio unit 302 of FIG. 3) that each includes one or more transmitters 1012 and one or more receivers 1014 coupled to one or more antennas 1016 (e.g., implemented by the digital front end 304, the analog front end 308, the antenna unit 310, and the DSP unit 318 of FIG. 3). The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
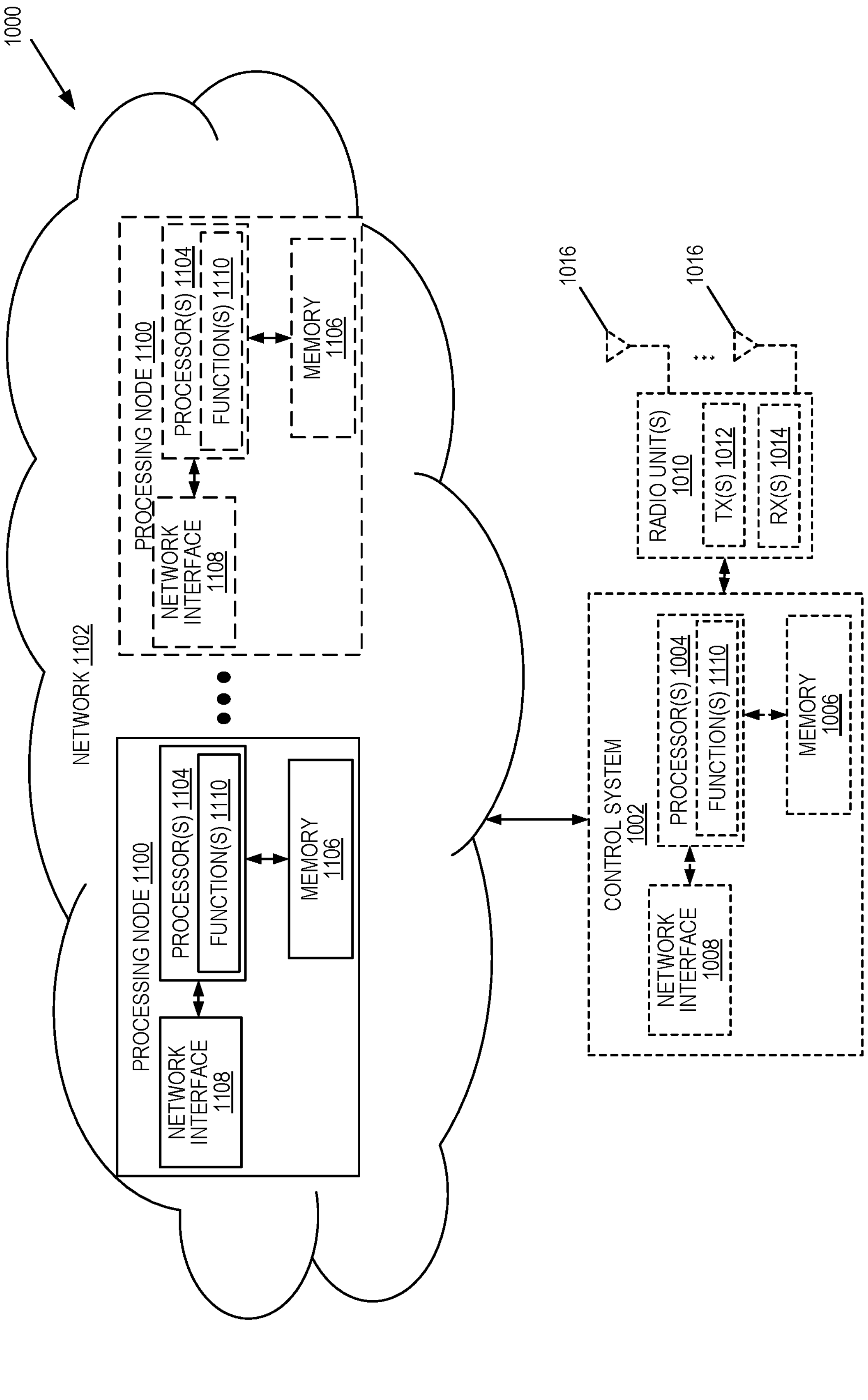
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure.

This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAS, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
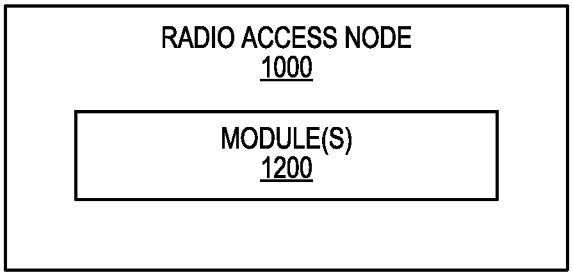
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
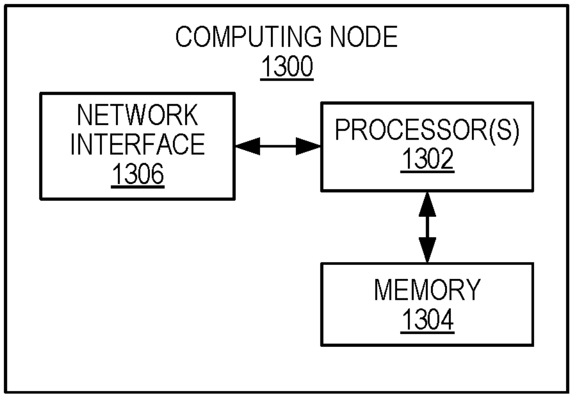
FIG. 13 is a schematic block diagram of a computing node 1300 according to some embodiments of the present disclosure.

FIG. 13 is a schematic block diagram of a computing node 1300 according to some embodiments of the present disclosure. Optional features are represented by dashed boxes. In one embodiment, the computing node 700 performs the training process described herein, e.g., with respect to steps Z100-904 of FIG. 9. In one embodiment, the computing node 700 is separate from the radio access node or base station that uses the trained model to predict network KPI degradation as described herein. As illustrated, the computing node 1300 includes one or more processors 1302 (e.g., Central Processing Units (CPUs), Application Specific Integrated Circuits (ASICs), Field Programmable Gate Arrays (FPGAs), and/or the like), memory 1304, and a network interface 1306. The one or more processors 1302 are also referred to herein as processing circuitry. In one embodiment, software implementing the training process is stored by the computing node 1300 (e.g., in memory 1304) and executed by the processor(s) 702 to thereby cause the computing node 1300 to perform the training process described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

The invention claimed is:

1. A computer-implemented method, comprising:

obtaining network-level Key Performance Indicator (KPI) data for a network and radio log data for one or more radio systems in the network;

the network-level KPI data comprising KPI values for one or more network-level KPIs; and the radio log data comprising a number of faulty or uncalibrated antenna branches in the radio system, and cell or user beamforming weights;

pre-processing the network-level KPI data and the radio log data to provide pre-processed network-level KPI data and pre-processed radio log data;

labeling the pre-processed network-level KPI data as degraded or non-degraded; and training with the labeled network-level KPI data and the pre-processed radio log data, a fault classifier Machine Learning (ML) model to output one or more values that represent a probability that the one or more network-level KPIs will be degraded for a given input feature set comprising input features representative of a number of faulty or uncalibrated antenna branches and cell or user beamforming weights.

2. The computer-implemented method of claim 1, wherein the one or more values that represent the probability comprise a probability that the one or more network-level KPIs will be degraded for the given input feature set.

3. The computer-implemented method of claim 1, wherein the one or more values that represent the probability comprise a bit that indicates that the one or more network-level KPIs will be degraded when the bit is set to a first binary value and indicates that the one or more network-level KPIs will not be degraded when the bit is set to a second binary value.

4. The computer-implemented method of claim 1, wherein the one or more values comprise a probability that the one or more network-level KPIs will be degraded for the given input feature set, and the method further comprises:

generating, using the trained fault classifier ML model, one or more values that represent a probability the one or more network-level KPIs will be degraded for a given input feature set comprising a given number of faulty or uncalibrated antenna branches in the radio system and given cell or user beamforming weights;

comparing the probability that the one or more network-level KPIs will be degraded for the given input feature set with a probability threshold; and raising an alarm or refraining from raising an alarm, based on a result of comparing the probability that the one or more network-level KPIs will be degraded for the given input feature set with the probability threshold.

5. The computer-implemented method of claim 4, wherein the probability threshold is static, semi-static, or dynamic.

6. The computer-implemented method of claim 1, further comprising:

comparing a given number of faulty or uncalibrated antenna branches with a threshold, wherein the threshold is a threshold number of faulty or uncalibrated antenna branches determined using the trained fault classifier ML model to result in a desired threshold probability that the one or more network-level KPIs will be degraded; and raising an alarm or refraining from raising an alarm, based on a result of the comparing.

7. The computer-implemented method of claim 6, wherein the threshold is statically, semi-statically, or dynamically selected based on the trained fault classifier ML model.

8. The computer-implemented method of claim 4, wherein the threshold is determined to minimize a probability of a false negative alarm given a probability of a false positive alarm, the false negative alarm being a missed detection of faulty or uncalibrated antenna branches and the false positive alarm being a raised false alarm.

9. The computer-implemented method of claim 1, wherein pre-processing the network-level KPI data and the radio log data to provide the pre-processed network-level KPI data and the pre-processed radio log data comprises:

time-aligning the network-level KPI data with the radio log data;

transforming the network-level KPI data into a first set of features that is usable by the fault classifier ML model; and transforming the radio log data into a second set of features that is usable by the fault classifier ML model;

wherein the first set of features corresponds to the pre-processed network-level KPI data, and the second set of features corresponds to the pre-processed radio log data.

10. A computer-implemented method comprising generating, using a trained fault classifier Machine Learning (ML) model, one or more values that represent a probability that one or more network-level Key Performance Indications (KPIs) will be degraded for a given input feature set comprising a number of faulty or uncalibrated antenna branches of an associated radio unit and cell or user beamforming weights.

11. The method of claim 10, further comprising:

comparing the probability that the one or more network-level KPIs will be degraded for the given input feature set with a probability threshold; and raising an alarm or refraining from raising an alarm, based on a result of comparing the probability that the one or more network-level KPIs will be degraded for the given input feature set with the probability threshold.

12. A node comprising processing circuitry configured to cause the node to:

obtain network-level Key Performance Indicator (KPI) data for a network and radio log data for one or more radio systems in the network;

the network-level KPI data comprising KPI values for one or more network-level KPIs; and the radio log data comprising a number of faulty or uncalibrated antenna branches in the radio system, and cell or user beamforming weights;

pre-process the network-level KPI data and the radio log data to provide pre-processed network-level KPI data and pre-processed radio log data;

label the pre-processed network-level KPI data as degraded or non-degraded; and train, with the labeled network-level KPI data and the pre-processed radio log data, a fault classifier Machine Learning ML model to output one or more values that represent a probability that the one or more network-level KPIs will be degraded for a given input feature set comprising input features representative of a number of faulty or uncalibrated antenna branches and cell or user beamforming weights.

13. The node of claim 12, wherein the one or more values that represent the probability comprise a probability that the one or more network-level KPIs will be degraded for the given input feature set.

14. The node of claim 12, wherein the one or more values that represent the probability comprise a bit that indicates that the one or more network-level KPIs will be degraded when the bit is set to a first binary value and indicates that the one or more network-level KPIs will not be degraded when the bit is set to a second binary value.

15. The node of claim 12, wherein the one or more values comprise a probability that the one or more network-level KPIs will be degraded for the given input feature set, and the processing circuitry is further configured to cause the node to:

generate, using the trained fault classifier ML model, one or more values that represent a probability the one or more network-level KPIs will be degraded for a given input feature set comprising a given number of faulty or uncalibrated antenna branches in the radio system and given cell or user beamforming weights;

compare the probability that the one or more network-level KPIs will be degraded for the given input feature set with a probability threshold; and raise an alarm or refraining from raising an alarm, based on a result of comparing the probability that the one or more network-level KPIs will be degraded for the given input feature set with the probability threshold.

16. The node of claim 15, wherein the probability threshold is static, semi-static, or dynamic.

17. The node of claim 12, wherein the processing circuitry is further configured to cause the node to:

compare a given number of faulty or uncalibrated antenna branches with a threshold, wherein the threshold is a threshold number of faulty or uncalibrated antenna branches determined using the trained fault classifier ML model to result in a desired threshold probability that the one or more network-level KPIs will be degraded; and raise an alarm or refraining from raising an alarm, based on a result of the comparison.

18. The node of claim 12, wherein the pre-process of the network-level KPI data and the radio log data to provide the pre-processed network-level KPI data and the pre-processed radio log data comprises:

time-aligning the network-level KPI data with the radio log data;

transforming the network-level KPI data into a first set of features that is usable by the fault classifier ML model; and transforming the radio log data into a second set of features that is usable by the fault classifier ML model;

wherein the first set of features corresponds to the pre-processed network-level KPI data, and the second set of features corresponds to the pre-processed radio log data.

19. A radio access node comprising processing circuitry configured to cause the radio access node to generate, using a trained fault classifier Machine Learning (ML) model, one or more values indicative of a probability that one or more network-level Key Performance Indications (KPIs) will be degraded for a given input feature set comprising a number of uncalibrated or faulty antenna branches of a radio unit of the radio access node and cell or user beamforming weights.

20. The radio access node of claim 19, wherein the processing circuitry is further configured to cause the radio access node to:

compare the probability that the one or more network-level KPIs will be degraded for the given input feature set with a probability threshold; and raise an alarm or refrain from raising an alarm, based on a result of comparing the probability that the one or more network-level KPIs will be degraded for the given input feature set with the probability threshold.

* * * * *